J. S. HAWLEY.
Tobacco Pipe.
No. 67,299.
Patented July 30, 1867.
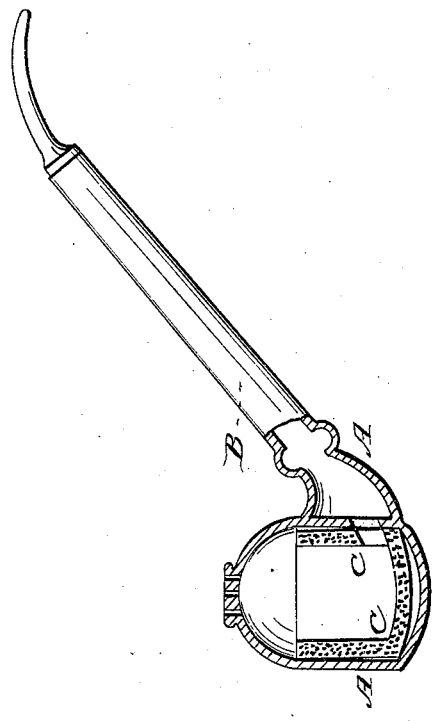
Witnesses:
Theo. Fuchs
J. A. Semice
Inventor:
J. S. Hawley
Per Munn & Co.
Attorney.

United States Patent Office.

JOHN S. HAWLEY, OF VIRGINIA CITY, NEVADA.

Letters Patent No. 67,299, dated July 30, 1867.

TOBACCO-PIPE.

The Schedule referred to in these Letters Patent and making part of the same.

TO ALL WHOM IT MAY CONCERN:

Be it known that I, J. S. HAWLEY, of Virginia City, Storey county, Nevada, have invented a new and improved "Tobacco-Pipe;" and I do hereby declare that the following is a full, clear, and exact description thereof, which will enable others skilled in the art to make and use the same, reference being had to the accompanying drawings, forming part of this specification.

The present invention consists in applying to the interior of the bowl to a tobacco-pipe a lining or coating made from the cob of corn, whereby the tobacco, by its being smoked, is prevented from fouling the pipe-bowl, and a means provided for absorbing the nicotine, which is not only cheap and inexpensive, but most efficient in every respect.

In the accompanying plate of drawings my improvement in "tobacco-pipes" is illustrated, the figure being a central vertical section through the bowl of a tobacco-pipe lined with corn-cob according to the present invention.

A, in the drawings, represents the bowl of a tobacco-pipe, and B the stem, both of which may be made of any of the material employed ordinarily therefor, and of any desired size and shape. C, a lining to inside of pipe-bowl A, which lining is made from the cob of corn, suitably cut out upon its outside to fit the inside of the bowl, and upon its inside to form the requisite bowl for receiving the tobacco to be smoked.

I claim as new, and desire to secure by Letters Patent—

The lining C of the tobacco-pipe, when cut from a corn-cob and inserted in the bowl A, as herein set forth for the purpose specified.

The above specification of my invention signed by me this 19th day of March, 1867.

JNO. S. HAWLEY.

Witnesses:
 WM. F. McNAMARA,
 ALBERT W. BROWN.